March 21, 1933.  H. GROB  1,902,554
VOLTAGE REGULATING APPARATUS
Filed Oct. 22, 1930
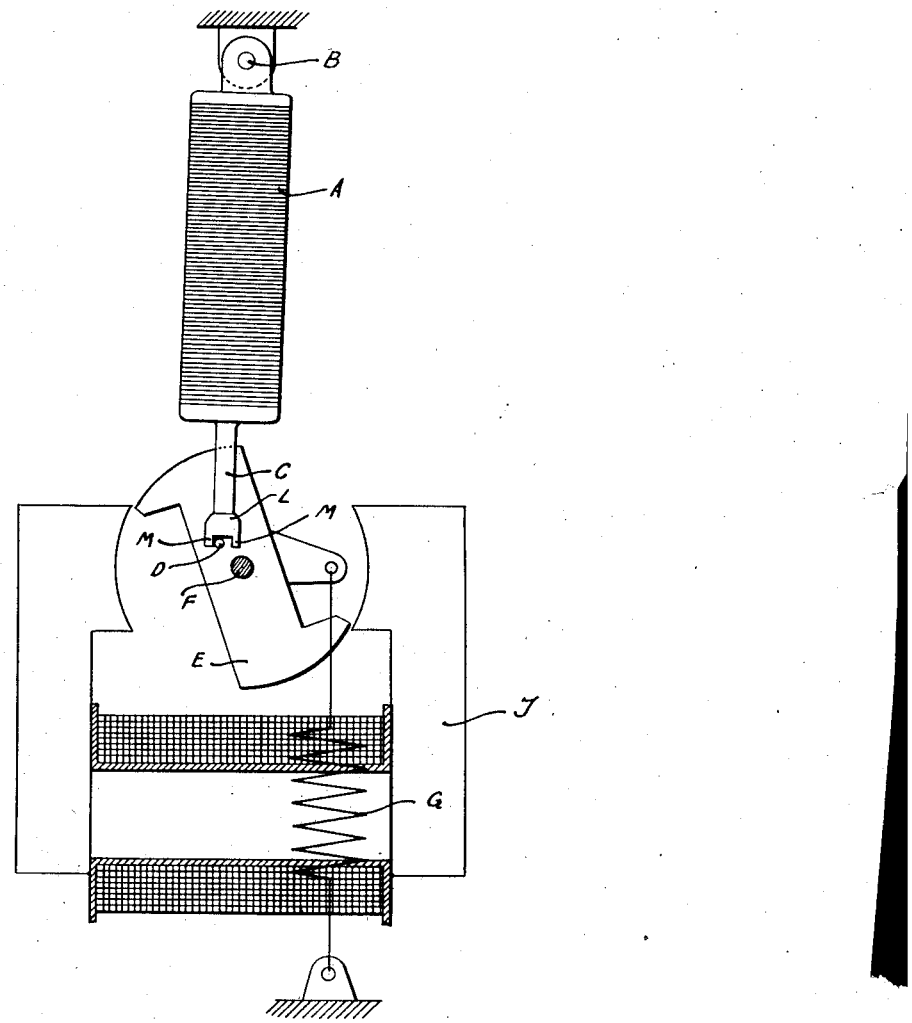
Hugo Grob
INVENTOR
BY
Janney, Blair & Curtis
ATTORNEY Patented Mar. 21, 1933

1,902,554

UNITED STATES PATENT OFFICE

HUGO GROB, OF BERLIN, GERMANY

VOLTAGE REGULATING APPARATUS

Application filed October 22, 1930, Serial No. 490,428, and in Germany October 22, 1929.

The present invention relates to a frictionless joint for voltage regulating apparatus.

The operation of an automatic regulator is, in the majority of cases, based on the fact that certain oppositely acting forces possessed by the regulator mechanism are maintained in a state of equilibrium for such time as the voltage to be regulated possesses the correct value, but are deprived of this equilibrium immediately a departure from the said value should tend to occur, whereby the displacement of the mechanism thus caused exerts the necessary regulating effect. In this connection it is extremely important that the mechanism should be capable of frictionless movement to all possible extent, similar to the movement performed by a weighing apparatus.

In one type of voltage regulator the regulating action is exercised by a column or pile of superimposed carbon discs, which are subjected to a varying pressure and thus vary their electrical resistance within wide limits. In certain instances the variation in pressure is performed by a magnet having a rotary armature, which exerts the necessary pressure by means of an eccentrically fitted stud.

Since for reasons of strength the diameter of this stud may not be less than a certain amount, while if a knife-edge bearing is employed the same must of necessity be furnished with a certain thickness in order to avoid all possible danger of fracture or chipping, friction of a disturbing kind accordingly results upon the rotary movement of the armature, due to the considerable pressure which may be exerted.

It is the primary object of the present invention to overcome this drawback, and this is accomplished by the use of a joint or connection, in which, despite the strong force transmitted, friction to any appreciable extent does not occur. The invention is accordingly based on the idea of not enclosing the rotary stud within a bearing of approximately the same radius, but of allowing the same to roll over a straight bearing which constitutes the base of a fork member formed by lateral abutments.

Other objects and advantages of the invention will become apparent as the description proceeds.

The invention will now be described more fully with reference to the accompanying drawing, which illustrates diagrammatically a possible form of embodiment.

In the drawing A represents the column or pile of carbon discs constituting a variable electric resistance, having at the top a rotary counter-bearing B and supported at the bottom by the fork-shaped pressure member C. The latter rests on the stud D of the magnet armature E, which is rotary about the bearing F. By means of the spring G the pile or column, with the assistance of the stud D, is subjected to compression with an angle-lever effect, but is again more or less relieved when the pull of the magnet J exceeds the force of the spring G.

According now to the invention, the bearing for the joint D—C is not constructed in the form of the usual type of bearing, but as a forked member having a flat bottom portion L, along which, when the armature rotates, the stud D is capable of rolling without friction. If the stud is incorrectly positioned in the fork, friction will only result upon the first movement of the armature, due to the abutments M. Upon any subsequent rotation merely a frictionless rolling action will take place.

The armature bearing F is preferably constructed as a ball bearing. The use of a ball bearing for the supporting point D will not, as a general rule, be found desirable for reasons of location or expense.

It will be understood that no restriction is made to the specific form of embodiment shown, which is quoted merely by way of example, and that various modifications are quite possible within the meaning of the above and the annexed claims without departing from the spirit of the invention.

What I claim as new and desire to secure by Letters Patent is:

1. In apparatus of the character described, in combination, a carbon pile, means pivotally supporting one end of said pile so that said pile may pivot about the axis thereof and means at the other end of said pile having a substantially flat face extending transversely of the length of said pile, said second-mentioned means with its flat face being adapted to move in a direction to vary the compression of said pile and to move with the said other end of said pile as the latter swings about said axis, an electromagnet having and controlling a rotatable armature, spring means acting upon said armature to rotate it in a direction opposite to that in which an increasing flux of said electromagnet rotates said armature, and a member carried by said armature at a point eccentric to the axis of rotation of said armature, said member having a curved face engaging said flat face and adapted to be in rolling contact therewith as the flux of said magnet rotates said armature in one direction to swing said pile in one direction about the axis of its pivot and as said spring rotates the armature in opposite direction to swing said pile in opposite direction about the axis of its pivot.

2. In apparatus of the character described, in combination, a carbon pile, means pivotally supporting one end of said pile so that said pile may pivot about the axis thereof and means at the other end of said pile having a substantially flat face extending transversely of the length of said pile, said second-mentioned means with its flat face being adapted to move in a direction to vary the compression of said pile and to move with the said other end of said pile as the latter swings about said axis, an electromagnet having and controlling a rotatable armature, spring means acting upon said armature to rotate it in a direction opposite to that in which an increasing flux of said electromagnet rotates said armature, said armature having a curved portion resting against said flat face and partaking of rolling contact therewith as said armature swings and thereby effecting swinging of said pile about the axis of its pivot.

3. In apparatus of the character described, in combination, a carbon pile, means pivotally supporting one end of said pile so that said pile may pivot about the axis thereof and means at the other end of said pile having a substantially flat face extending transversely of the length of said pile, said second-mentioned means with its flat face being adapted to move in a direction to vary the compression of said pile and to move with the said other end of said pile as the latter swings about said axis, an electromagnet having and controlling a rotatable armature, spring means acting upon said armature to rotate it in a direction opposite to that in which an increasing flux of said electromagnet rotates said armature, said armature having a curved portion positioned on that side of the axis of said armature that is toward said carbon pile and said curved portion engaging said flat face, said pile and the means related to its ends forming one arm of a toggle of which the portion of said arfature between the axis of the latter and said curved portion forms the other arm, whereby said curved portion and said flat face are in rolling contact as said electromagnet and said spring flex said toggle.

4. In apparatus of the character described, in combination, a variable toggle made up of two pivoted arms, one of which is in the form of a compressible carbon pile and the other of which is in the form of a lever arm, the free ends of said carbon pile and said lever arm having parts fixed thereto and shaped for rolling contact with each other whereby, as said toggle is flexed, the rolling contact of one of said parts with respect to the other shifts the effective point of pivotal connection between the two arms of the toggle.

5. In apparatus of the character described, in combination, a carbon pile having a rigid abutment at one end and provided with a forked member at its other end, said forked member having a substantially straight-line portion intermediate the arms of the fork, and an electromagnetically controlled member mounted to pivot about a relatively fixed axis and having a part extending between the arms of said forked member and engaging said straight-line portion, said part being spaced from the axis of said second-mentioned member and having a curved face in direct engagement with said straight-line portion for rolling contact with the latter, said part with its curved face swinging with said electromagnetically controlled member.

6. In apparatus of the character described, in combination, a carbon pile having a rigid abutment at one end and provided with a forked member at its other end, said forked member having a substantially straight-line portion intermediate the arms of the fork, a rotatably mounted armature, means including electro-responsive means for controlling the rotary movement of said armature, and a stud fixed to said armature and spaced from the axis of the latter, said stud engaging between the arms of said forked member and having a curved face of relatively small radius directly engaging the straight-line portion of said forked member, whereby said stud and forked member are in rolling contact as said armature swings about its axis.

7. In apparatus of the character described, in combination, means forming two spaced and relatively fixed axes, a carbon pile, means pivoting one end of said carbon pile to one of said axes, a pressure-transmitting member at the other end of said carbon pile, and a member mounted to swing about the other of said two axes, said two members having portions engaging each other and shaped so that one rolls upon the other as said second member is swung.

In testimony whereof I have affixed my signature.

HUGO GROB.